Sept. 23, 1969  L. W. ALVAREZ  3,468,596
STABILIZED ZOOM OPTICAL DEVICE
Filed Jan. 26, 1966
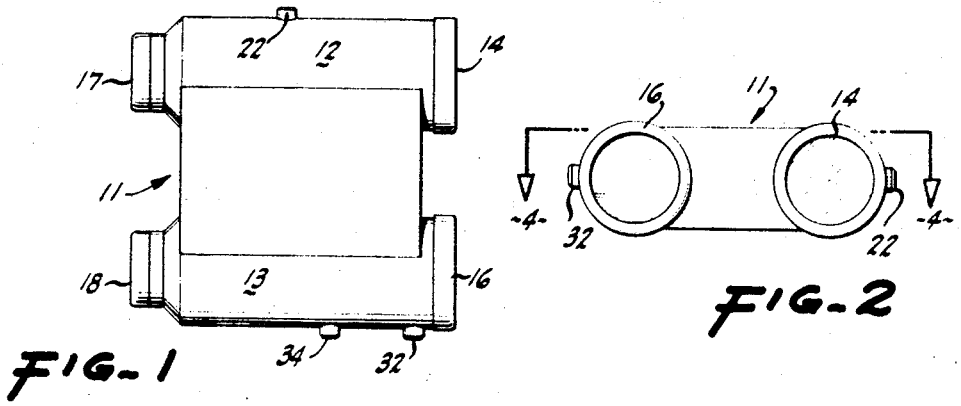
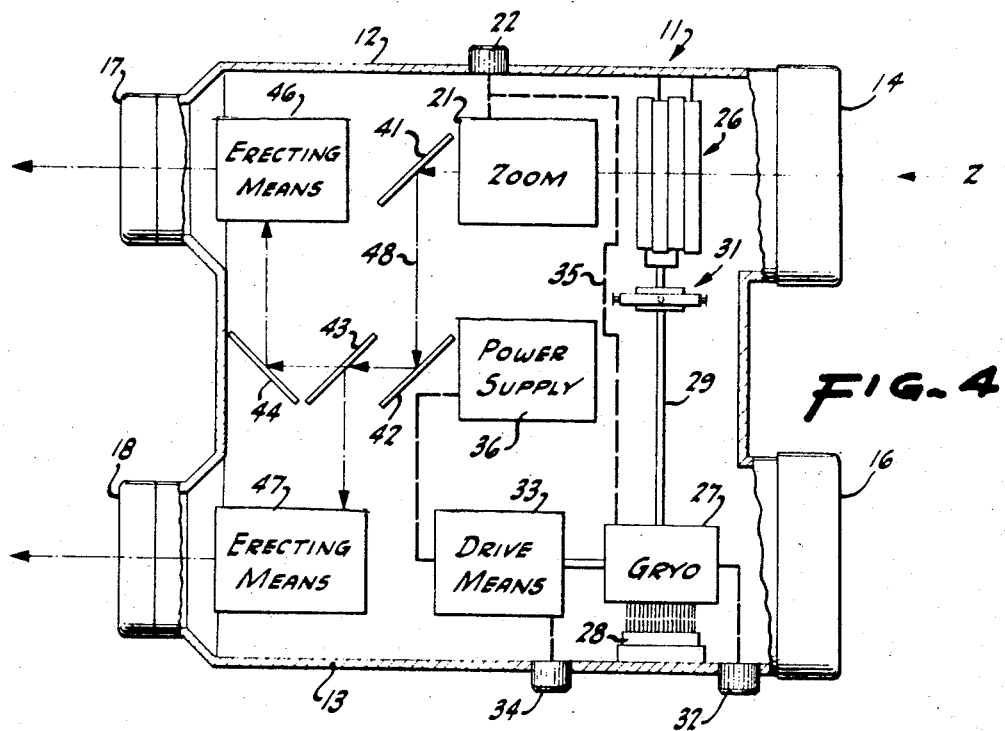
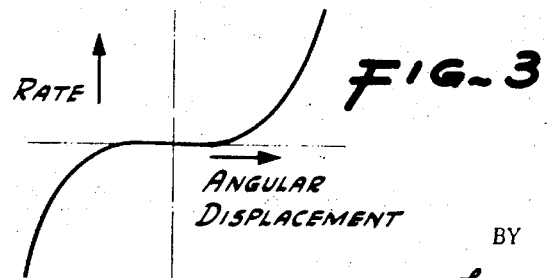
INVENTOR.
LUIS W. ALVAREZ
BY
Lippincott, Ralls & Hendrickson
ATTORNEYS United States Patent Office 3,468,596
Patented Sept. 23, 1969

3,468,596
STABILIZED ZOOM OPTICAL DEVICE
Luis W. Alvarez, Berkeley, Calif., assignor to Optical Research and Development Corporation, Oakland, Calif., a corporation of California
Filed Jan. 26, 1966, Ser. No. 523,163
Int. Cl. G02b 23/12
U.S. Cl. 350—16
3 Claims

ABSTRACT OF THE DISCLOSURE

A stabilized zoom optical device including a binocular case mounting a monocular optical train comprising a zoom lens system, an image splitting apparatus for binocular viewing, and a variable prism optical compensator. At least one element of the variable prism optical compensator is connected to and moved by an interior stabilizer at an increasing rate with increasing angular deflection of the casing axis to stabilize the image processed therethrough.

---

The present invention relates in general to variable-power optical instruments or devices that are adapted to be hand held, and more particularly to a stabilized zoom mono-binocular.

Conventional binoculars are adapted to be hand held, and because of the unavoidable vibrations and movement of hand-held devices, it is commonly accepted that binoculars can only have a limited useful magnification, even though much greater magnification is often desired. In practice, binoculars are limited to magnifications of the order of 7 or 8, for not only is the field of view magnified, but also the movement thereof is magnified and consequently larger magnification introduces such a jitter or vibration of the field of view that the eye cannot follow same. Another problem involved in increased magnification through binoculars is the difficulty of properly locating a particular object of view. This problem might be overcome by providing variable magnification so that a broad field of view would originally be available for location of an object and a particular portion of the field of view could then be magnified, as desired. Unfortunately, this type of binocular arrangement has not been useful, even though variable magnification optics are known in the art, and the wide application of so-called "zoom optics" in television and 8 mm. moving picture cameras has resulted in marked development of this field to the point where zoom lenses or zoom optical systems are relatively conventional. Hitherto unavoidable magnification of motion as well as objects has precluded the use of zoom optics in binoculars with ultimate powers greater than 7 or 8. The zoom feature does not add much that is useful at low powers, and it cannot be used effectively at the desired higher powers.

The present invention provides for the inclusion of zoom optics in hand-held optical viewing devices to afford power variations from the order of 3 to 12, or 8 to 35 magnification. In accordance herewith, the optical instrument includes an inertial lens stabilization system for removing optical jitter. This stabilization introduces one or more variable-deflection prisms in the optical path, so as to counteract undesirable and unavoidable vibrations, and the like, of the system, whereby images transmitted through the system are viewed as stationary. In addition, the present invention provides for monocular or telescopic transmission of the field of view through the major portion of the optical system, and may provide for the splitting of the focused image or field of view, so as to provide the user with a binocular effect. In this way, the present invention precludes various expected alignment difficulties and other complexities of variable-power binoculars. The size and weight of the present invention may closely approximate those of regular binoculars. Also, the invention eliminates the requirement for accurately tracking two physically separated stabilized lens systems, inasmuch as the invention requires only a single stabilized lens system. The two eyepieces of a binocular are primarily provided for the purpose of allowing the viewer to utilize both eyes, rather than to provide any type of stereoscopic effect. Consequently, a monocular system provides substantially the same viewing, and the present invention employs means to divide the image so that binocular eyepieces may be utilized with the monocular. It is, of course, appreciated that a monocular of a certain aperture receives only one-half of the light received by the two objectives of a pair of similar binoculars; however, this is of little importance in daytime viewing.

With regard to stabilization, a refractive-type stabilizer may be considered as establishing a variable deflection prism having a deflection angle just sufficient to cancel out angular deflections of the binocular case from the intended line of sight. Although optical elements comprising such a variable deflection prism will introduce aberrations, these aberrations are unobjectionable in the lower magnification ranges, and can be eliminated at the higher magnification ranges by introducing compensating aberrations in additional lens elements. Optical stabilization is described in detail in my U.S. Patent No. 3,378,326, issued Apr. 16, 1968, entitled "Gyroscopically Controlled Accidental Motion Compensator for Optical Instruments," and reference is made thereto for a complete explanation of stabilized optics. Although it is not intended to limit stabilization hereof to any particular inertial system, the present invention is described in connection with gyroscopic systems wherein a particularly designed, substantially-free gyro is employed. Such a gyro is not called upon to supply any power or force to the system as a whole, but instead, is utilized to maintain the line of sight of portions of the lens system free from angular deviation. Again, reference is made to my co-pending patent application for a discussion of requisite and desirable gyroscope characteristics, as well as an explanation of manners of obtaining such characteristics.

The present invention is illustrated as to a single preferred embodiment thereof in the accompanying drawing, wherein:

FIGURE 1 is a plan view of mono-binoculars embodying the present invention;

FIGURE 2 is an end elevational view of the embodiment of FIGURE 1;

FIGURE 3 is a graph of a gyroscope characteristic; and

FIGURE 4 is a transverse sectional view taken in the plane 3—3 of FIGURE 2.

Considering now the illustrated embodiment of the invention and referring to the drawing, it will be seen that the external case 11 has substantially the same configuration as that of conventional binoculars. Additionally, the size of this case may be substantially the same as the size of conventional binoculars. However, it is noted that the two barrels 12 and 13 are not movable relative to each other, i.e., the entire case 11 is rigid.

In order to further simulate the conventional and accepted appearance of binoculars, each of the barrels 12 and 13 may be provided with front lenses or lens caps 14 and 16, as indicated, although but a single barrel actually contains an optical path therethrough. At the rear of the case 11, there are provided a pair of eyepieces 17 and 18. In order to accommodate varying eye separations between different users, it is possible to employ the type of eyepiece movement utilized with microscopes even though a monocular system is employed. Inasmuch as this feature is well known in the art, it is not illustrated or further described herein.

Considering now the elements of the present invention housed in the case 11, and referring to FIGURE 4, it will be seen that within one of the barrels 12 there are disposed the optical elements of the invention and within the other barrel there is disposed the inertial stabilizer. Illustration of the elements of the present invention are only schematic, inasmuch as each of the individual elements is known in the art and details thereof are elsewhere available. As a portion of the optical system of the present invention, there is provided a variable magnification lens unit 21, mounted within the barrel 12 and having control means 22 extending exteriorly of the housing 11. This unit 21 hereinafter denominated as a "zoom lens system" cooperates with or includes the objective lenses of the overall optical system. The control means 22 is manually operable to vary magnification of the zoom lens, and in the present instance this magnification may, for example, extend over the range of 7 to 35. Thus, a user of the binoculars may change the magnification by simply turning a knob or moving a lever of the control means 22.

Ahead of the zoom lens within the barrel 12, there is provided a self-stabilized optical compensator 26, and these units 21 and 26 are displaced along an optical axis Z extending through the barrel. In brief, the optical compensator includes at least two and preferably more, individual lenses adapted for relative transverse movement to establish variable deflection compensating prisms in the light path. The relative movement of compensator lens elements is controlled so as to provide just the right amount of prism deflection to compensate for angular deviations of the housing from a desired line of sight. Movable elements of this compensator 26 are mechanically linked to a substantially-free gyroscope 27 mounted in the other barrel 13 of the housing. No gearing or servomechanisms are involved. The term "free gyroscope" or "free gyro" is herein taken to mean a gyroscope that under friction-free circumstances would maintain the rotor pointing at a fixed point in space, such as a star. Such a gyroscope is not pendulous, nor does it have any torquing devices that act to move it away from an intended line of sight. However, a "substantially-free gyro" as herein employed, does have a torquing system that erects the gyro axis to follow a changing means axis of the case with an angular rate dependent upon the change of angle. The foregoing may be best understood by reference to FIGURE 3 of the drawing wherein there is illustrated a useful gyro erection curve. As will be seen from this curve, slight angular deviations of the case from an intended line of sight produce substantially no gyro rotor axis effects. Larger angular case movements, as intentional "panning," produce an increasing rate of gyro erection. This then causes the gyro rotor axis to remain substantially unaffected or "stationary" for accidental tremor motions of a hand-held device so that the compensator of the invention produces the requisite variable prism action to eliminate image movement. Intentional turning or panning of the optical device from an initial line of sight produces the illustrated increasing rate of gyro axis movement with increasing angular deviation from original line of sight so that the entire compensator moves with the case. This then provides for desired image stabilization and requisite freedom of device movement. In FIGURE 4 there is schematically illustrated a torquing device 28 in association with the gyro 27 for erecting the gyro as required. Case movements of small magnitude or relatively high frequency do not bring the torquing device substantially into effect. Connection of the gyroscope rotor to movable elements of the compensator is accomplished by appropriate mechanical linkage 29 including a gimbal system 31. No attempt is made in the drawing to identify details of gyroscopes, linkages, or gimbal systems, inasmuch as these elements are well known and may be designed in a variety of ways for particular applications.

In addition to the gyroscope itself and the means for erecting same as required, the invention includes control means 32 for caging and uncaging the gyro. These means extend exteriorly of the case 11 so as to be readily operable by one using the binoculars, and it is intended that the gyro will only be uncaged during actual viewing operations, not while the target is being "acquired." Motive power for the gyro is provided by drive means 33 controllably connected to the gyro rotor for rotating such rotor at a high speedd uring actual viewing operations with the binoculars. These drive means 33 include a control or initiator 34, also extending exteriorly of the housing and under certain circumstances combined with the gyro caging control 32. The drive means may, for example, comprise a small dry cell battery and electric motor or other transducing means controllably coupled to a gyroscope rotor shaft, or may be separately energized from a power supply 36. The caging means 32 may be purely mechanical, or of some other type, operable with a gyroscope to lock the gyro rotor axis in fixed position when not in use. Clearly, a single control member, such as a button or the like on the exterior of the case, may operate both the caging control and drive means. It is also possible to incorporate the caging means with the zoom control, as schematically illustrated by the dotted line 35 in FIGURE 4. With the zoom in low power, the gyro rotor is then caged and this is possible because the compensating or stabilizing action is not required. As the zoom power is increased, the gyro rotor is uncaged to operate the compensator 26 so that necessary image stabilization at higher magnification is achieved. It is not intended by the foregoing description of gyroscope connections to limit the present invention to any particular mechanical arrangement; however, it is noted that gyroscope erection is particularly tailored so that the gyroscope rotor avis maintains fixed angular alignment in space over a predetermined range of movement and frequency of movement of the case, and erects in the manner described above. This gyroscope characteristic is particularly important, for otherwise intentional movement of the binocular case would not cause the optical system of the binoculars to move with the case and would prevent panning.

With the compensator 26 in operation ahead of the zoom optical system 21, it will be seen that the stabilizer directs light into the zoom lens in the same manner whether or not the case vibrates or moves in any manner through small angular deviations from a line of sight, so that a magnified image projected from the back end of the unit 21 is stationary and does not vibrate despite the magnification of the image in the zoom unit. In accordance with the present invention, the image light leaving the back end of the zoom unit is projected through the two separate eyepieces 17 and 18 for convenience of viewing by a user. This may be accomplished by the provision of various types of optical arrangements that may employ lenses, prisms, and/or mirrors. As illustrated, a first 45 degree mirror 41 reflects the image to a second 45 degree mirror 42 that, in turn, directs the image upon a "half-silvered" mirror 43. The image is "split" by the mirror 43 and directed through erecting means 46 and 47 to the eyepieces 17 and 18. A mirror 44 redirects the image into the erecting means 46, and it is noted that the optical path identified by the line 48 extends an equal distance to each eyepiece. Of course, a variety of optical systems and components may be employed following the zoom system 21 and, for example, the mirrors may be totally reflecting surfaces of solid pieces of glass, the erecting means may be porro prisms, or the like, and various elements such as mirrors 41 and 42 may be eliminated for a "cyclops-type" device.

With regard to the combination of compressor 26 and zoom lens system 21 or other lens system, it is noted that superior results are obtainable by designing them together. For slow lens systems (high *f* number) a separate compensator is quite satisfactory, but for more demanding applications as in cameras requiring high-speed lenses, the stabilization and zoom components should be designed together.

Considering now operation of the present invention, it is first noted that the mono-binoculars appear and feel substantially the same as conventional binoculars. The added weight of gyroscope and drive is counteracted by removal of optical elements from one of the barrels so that the final weight of the mono-binocular may closely approximate that of conventional binoculars. Initially, the gyroscope is caged, and preferably no power is applied thereto. With the zoom system 21 set for minimum magnification, a view through the two eyepieces 17 and 18 by a user will provide the same results as if the user were looking throught conventional binoculars. At the control of the user, the magnification power of the binoculars may be increased to thus zoom in on some portion of the original field of view. Prior to increasing magnification, the user energizes and uncages the gyro so that the compensator 26 is made fully operable. This actuation of the compensator may be simply accomplished by a button, knob, or lever on the side of the case in a readily accessible position. As soon as the compensator is activated, the field of view will be noted by the user to steady even through the mono-binoculars are hand held, for the compensator introduces one or more variable prisms which just counteract angular motions of the case resulting from any unsteadiness of its support. With the compensator in operation, the zoom system 21 is then operated to increase magnification up to a value of 25 or 30, if desired. As the field of view decreases in extent and is magnified by the zoom optics, the viewer employing the invention will note that the viewed image remains very steady in the field of view. The compensator 26 removes image motion, and consequently the added magnification of the image itself does not observably increase image vibration or movement. It is thus possible for a user to view a distant object through substantial optical magnification while holding the viewing device by hand, and to vary magnification at will.

Under many circumstances, it is desirable to move the field of view so as to follow a moving object, for example. The present invention accommodates such movement, for as the binocular case is swung through an angle, the gyroscope 27 is erected by the torquing means 28 to move the gyroscope rotor axis with the optical axis of the device. While it is true that a slight lag occurs between rotor-gyro erection and case movement, the amount of such lag is controllable in the design of the instrument and may be minimized sufficiently so as to cause no difficulty to the viewer. As the binocular case is stopped at a new angular position, the gyroscope rotor axis also stops in alignment with the optical axis of the instrument, and the compensator optically removes small relatively high-frequency image motions otherwise brought about by unintentional case movements, just as it has done during the panning operation just described.

As an example of instrument use, consider the situation wherein a hunter is attempting to locate a wild animal at considerable distances. With limited magnification, a large field of view may be rapidly scanned, and upon noticing any item of interest in such field, the magnification of the instrument may be increased to magnify the desired portion of the field for positive identification of the item of interest. Should this be a wild animal, the very substantial optical magnification available herewith provides for positive identification and careful scrutiny, hitherto available only through the fixed mounted instruments. Should the identified item prove to be a game animal that the hunder desires to shoot, the zoom feature of the binoculars may be employed to widen the field of view for better identification of landmarks and the like, indicating the exact location of the animal. If the animal were to move, and the hunter desires to follow the course of movement, it is only necessary for him to swing the instrument to maintain the animal in the field of view, and the instrument will track by erection of the gyro. This, then, provides all of the expected advantages and utilities of conventional binoculars with the added feature of stabilized field of view and variable magnification. At the end of a panning operation when the case movement is halted, the gyroscope axis is substantially realigned with the optical axis of the instrument, and the minor angular deviations of the case from such optical axis are compensated by the variable prisms of the compensator to maintain a stabilized image in the field of view of the user.

Although the present invention has been described above in connection with a single preferred embodiment thereof, it is not intended to limit the invention to the precise terms of the foregoing description or the details of the illustrated embodiment. It is realized that a wide variety of modifications and variations in the illustrated embodiment of the invention may be made, and thus attention is invited to the following claims for a precise delineation of the true scope of this invention.

What is claimed is:

1. A hand-held instrument comprising: a case; an objective lens mounted at the front of the case; zoom lens means mounted in said case along a common optical axis with the objective lens for cooperation with said objective lens to provide variable magnification; eyepiece means mounted at the rear of the case for viewing an image formed by said objective lens and zoom lens means; an optical compensator comprising at least one pair of lenses mounted between the objective lens and cooperating zoom lens means along the common optical axis for relative movement transverse to said axis; an inertial stabilizer coupled to one lens of any said pair of optical compensator lenses; and a torquing system interposed between the inertial stabilizer and the casing, and mounting said inertial stabilizer to the casing, said torquing system having a characteristic curve of the rate of the movement imparted to the inertial stabilizer versus angular displacement of the casing selected to move the inertial stabilizer as a result of movements of said case, at an increasing rate with increasing angular case movement whereby optical images viewing through the instrument are stabilized throughout a range of magnification despite small case movements, and whereby the compensator and stabilizer follow the case during wide angle scanning movements.

2. The instrument of claim 1 further defined by said inertial stabilizer comprising a substantially free gyroscope mounted on a torquing system for erecting the gyroscope to follow sustained angular case movements from a line of sight and substantially unaffected gyroscope axis direction for slight case movements, and further including drive means for sa id gyroscope for rotating the rotor thereof, and control means extending outside of said case for releasably uncaging said gyroscope.

3. A hand-held instrument comprising: a case; objective lens mounted at the front of the case; zoom lens means mounted in said case along a common optical axis with the objective lens for cooperation with said objective lens to provide variable magnification; an optical compensator comprising at least one pair of lenses mounted between the objective lens and cooperating zoom lens means along the common optical axis for relative movement transverse to said axis; gyroscope stabilizing means coupled to one lens of any said pair of optical compensator lenses; said gyroscope stabilizing means having torquing means a torquing system interposed between the inertial stabilizer and the casing, and mounting said inertial stabilizer to the casing, said torquing system having a characteristic curve of the rate of movement imparted to the inertial stabilizer versus angular displacement of the casing selected to move the gyroscope means as a result of movement of said case, at an increased rate with increasing angular case movement whereby optical images viewed through the instrument are stabilized throughout a range of magnification despite small case movements, and whereby the optical compensator and gyroscope means follow the case during wide angle scanning movements; said case having the configuration of a binocular case having two cylindrical barrels in side-by-side relation with said common optical axis through the objective lens and zoom lens means being disposed in one barrel and said gyroscope stabilizing means being disposed in the other barrel; a pair of eyepieces for viewing an image formed by the objective lens and zoom lens means, one eyepiece disposed at the end of each barrel of the casing; a division of amplitude beamsplitter and an optical train positioned in the case to direct light received from the zoom lens means onto said beamsplitter; and further optics positioned in the case to direct each of the bifurcated rays of light from said beamsplitter to one of the pair of eyepieces respectively.

References Cited

UNITED STATES PATENTS

| | | | |
|---|---|---|---|
| 1,863,558 | 6/1932 | Holder | 350—16 |
| 2,570,130 | 10/1951 | Kenyon | 88—15 |
| 2,811,042 | 10/1957 | Kenyon. | |
| 2,829,557 | 4/1958 | Jensen. | |
| 2,939,363 | 6/1960 | Kaestner | 350—16 |

FOREIGN PATENTS

| | | |
|---|---|---|
| 893,782 | 10/1944 | France. |
| 1,015,916 | 1/1966 | Great Britain. |
| 560,580 | 12/1955 | Italy. |

DAVID SCHONBERG, Primary Examiner

P. R. GILLIAM, Assistant Examiner